Nov. 13, 1934.                LE ROY L. HANDY                 1,980,403
                                SURFACING TOOL
                   Filed May 11, 1931          3 Sheets-Sheet 1
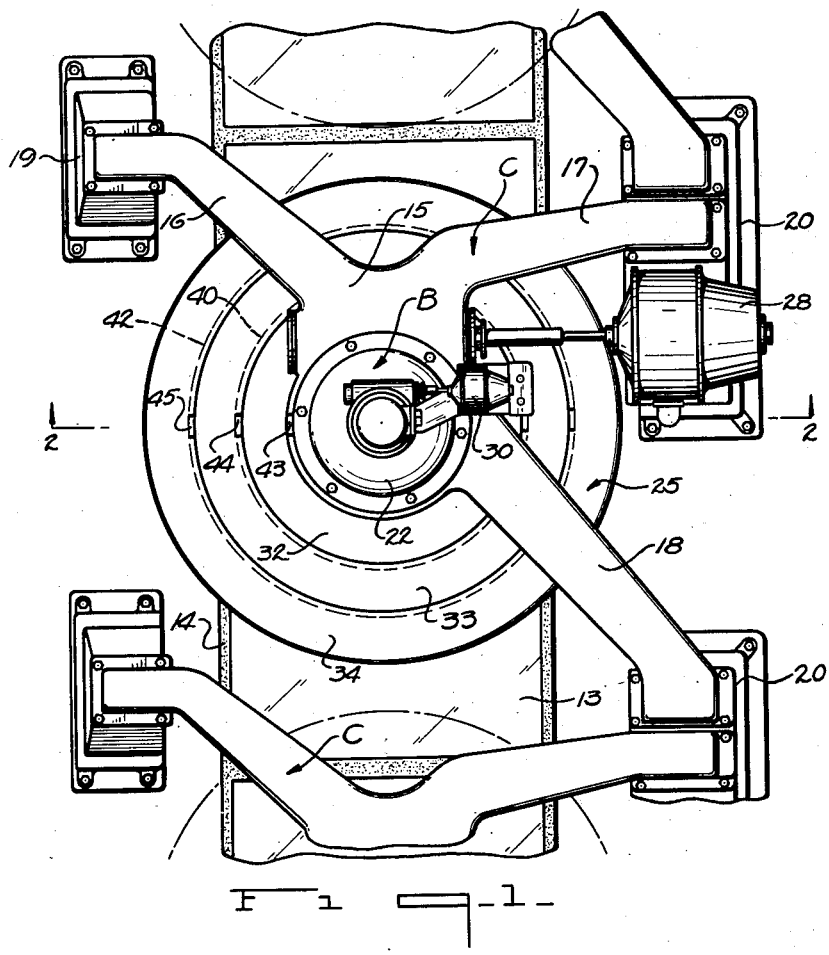
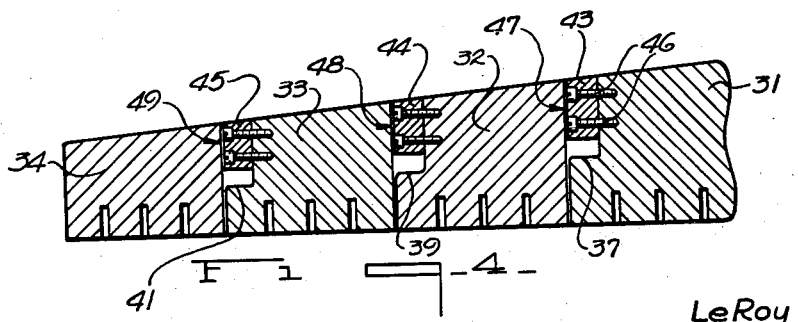
INVENTOR
LeRoy L. Handy
BY
Frank Fraser
ATTORNEY

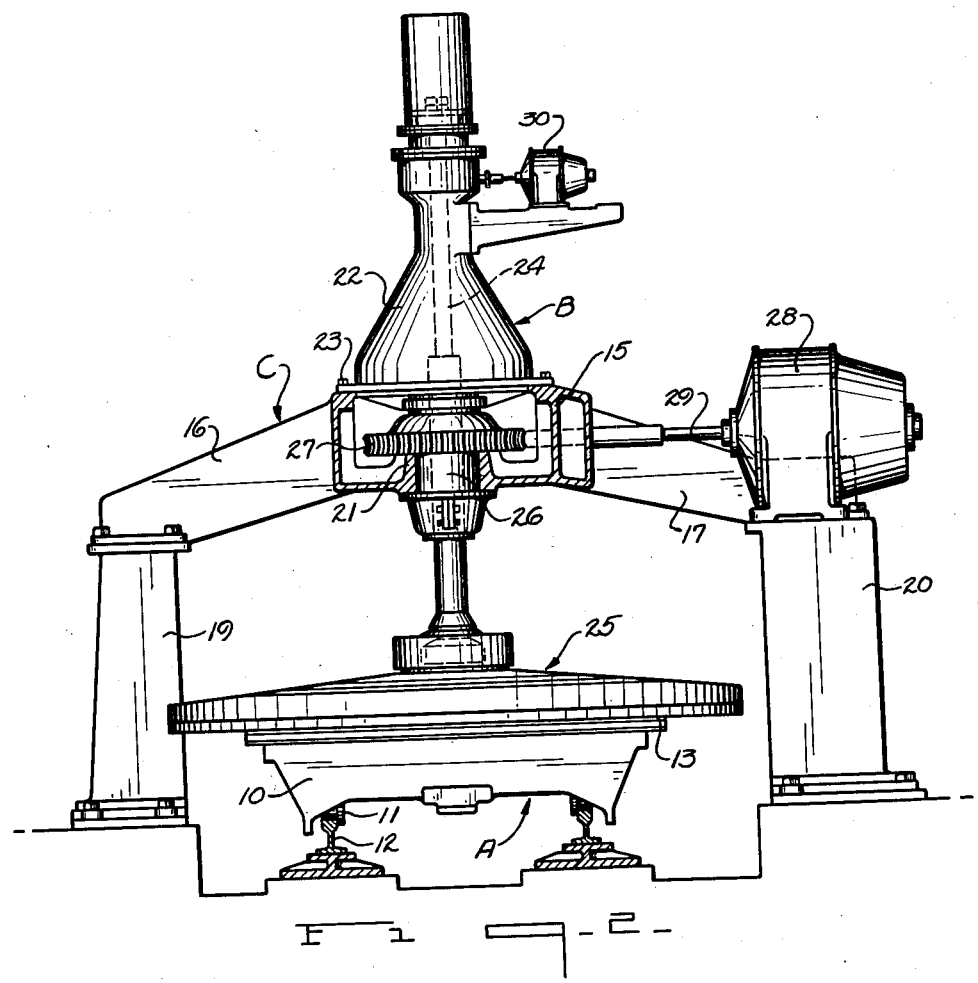
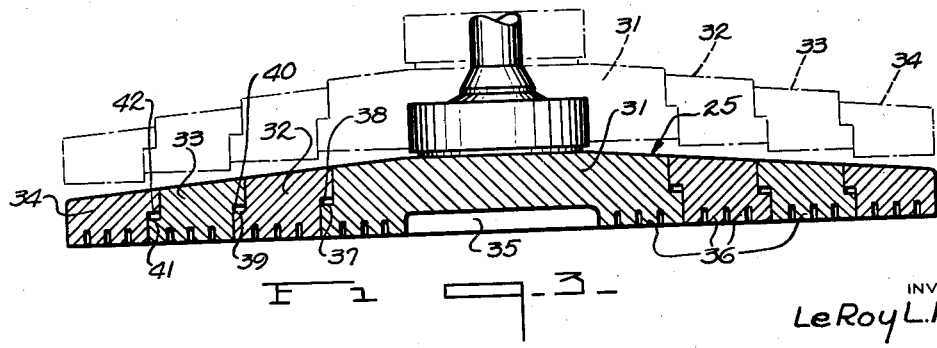

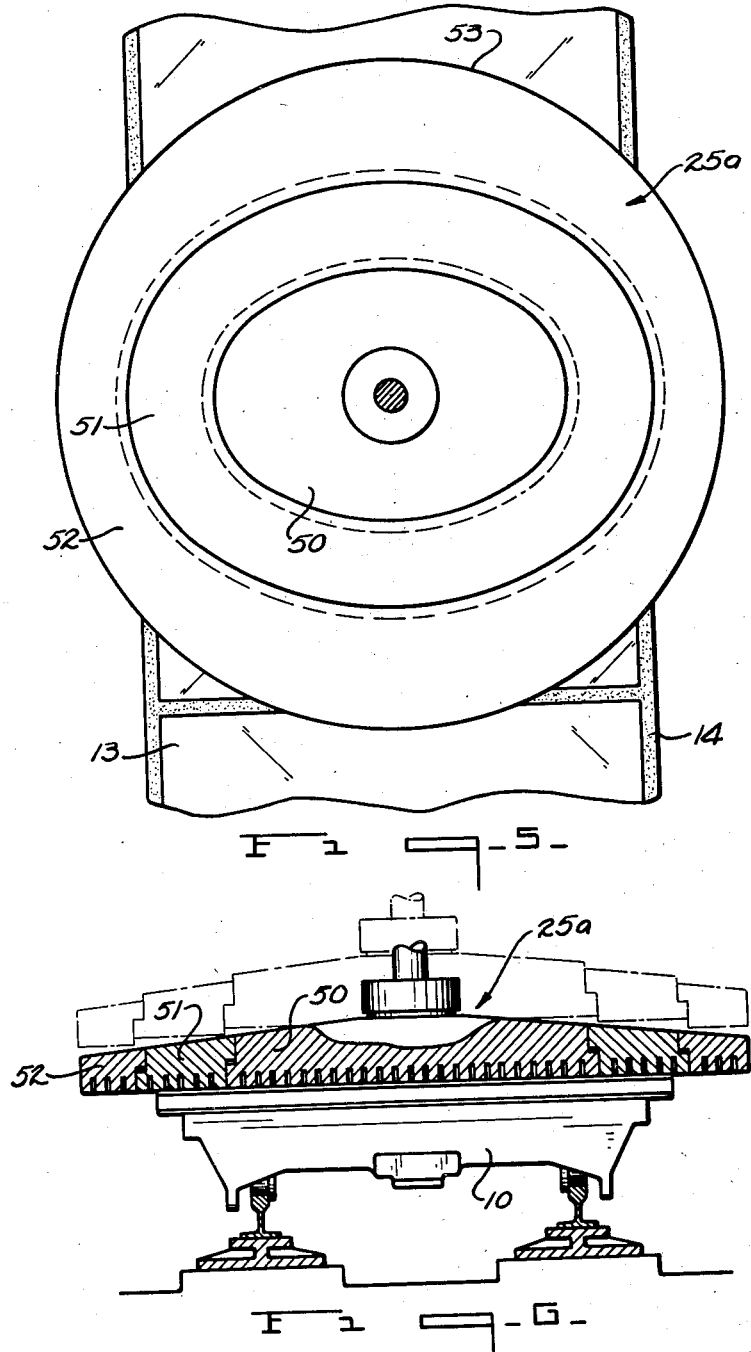

Patented Nov. 13, 1934

1,980,403

UNITED STATES PATENT OFFICE 1,980,403

SURFACING TOOL

Le Roy L. Handy, Toledo, Ohio, assignor to Libbey-Owens-Ford Glass Company, Toledo, Ohio, a corporation of Ohio Application May 11, 1931, Serial No. 536,367

15 Claims. (Cl. 51—209)

The present invention relates broadly to an apparatus designed for the surfacing of sheet glass or other flat sheets or plates and more particularly to the provision of a novel and improved form of grinding tool or runner.

The grinding tool or runner forming the subject-matter of this invention is particlarly well adapted for use in the continuous system for surfacing sheet glass wherein a plurality of tables or other carriers are arranged to carry a plurality of glass sheets mounted thereupon in a definite substantially horizontal path first beneath a series of grinding units and then beneath a series of polishing units. However, it is to be clearly understood that the invention is not limited to use in such connection.

In the continuous system referred to above, the grinding runners or tools ordinarily employed consist of single solid disks, the runners being quite large and exceedingly heavy since they are usually constructed of cast iron or some other metal. The glass, before being ground, has waves and high spots distributed irregularly over its surface and, if a single disk is used, especially on relatively wide sheets, the total pressure on the high spots would be such as would tend to cause a breakage of the glass. That is to say, as the glass sheet is carried along, the uneven or thicker portions of the sheet passing beneath the grinding runner tend to effect a raising or lifting thereof. When this occurs, the entire weight of the runner naturally rests upon the sheet at this particular point and the pressure exerted thereby is very apt to cause a fracture or breaking of the glass.

The principal aim, therefore, of the present invention is to entirely eliminate or reduce to a minimum breakage of the glass sheets from this cause. This is herein accomplished by constructing the grinding tool or runner of a central disk and a series of independent telescoping rings associated therewith and also with one another to form a tool of substantially annular or disc formation but with each ring being movable vertically relative to the remaining rings and also with respect to the central disk so that any one ring is free to rise up on the high spots of the glass independently of the other rings. As a result, when an uneven portion of the sheet passes beneath the runner, only that particular ring with which the thicker or raised portion thereof contacts will be lifted and thus the total pressure on any high spot will amount to the weight of the individual ring so lifted whereby only a fraction of the entire weight of the tool will rest thereupon. The weight of only a single ring is not adapted to be such as to exert sufficient pressure upon the glass to cause a breakage or fracture thereof.

Other objects and advantages of the invention will become more apparent during the course of the following description when taken in connection with the accompanying drawings.

In the drawings forming a part of this application and wherein like numerals are employed to designate like parts throughout the same, Fig. 1 is a plan view showing a grinding runner constructed in accordance with the present invention and illustrated in the continuous system for surfacing sheet glass, Fig. 2 is a transverse section taken substantially on line 2—2 of Fig. 1, Fig. 3 is a transverse section through the improved grinding runner, Fig. 4 is a similar view through another portion of the grinding runner showing the driving means for the several individual rings, Fig. 5 is a plan view of a modified form of tool, and Fig. 6 is a transverse section therethrough.

The surfacing apparatus illustrated in the drawings by way of example is of the so-called continuous type and consists essentially of three principal units including the carrier system for supporting the glass sheets or the like to be surfaced and which is designated in its entirety by the letter A, the grinding machine proper designated in its entirety by the letter B, and the supporting means or frame for the machine designated at C.

The carrier system A consists of a plurality of cars or tables 10 supported upon wheels 11 which run along tracks or rails 12. A desired number of tables 10 are adapted to be arranged end to end in preferably abutting relation as is well known in the art and movable along the rails 12 in a predetermined horizontal path to carry the glass sheets 13 mounted thereupon first beneath a series of grinding machines B and then beneath a series of polishing machines (not shown). The glass sheets are preferably secured upon the upper surfaces of the tables by embedding them within a layer of plaster of Paris or the like 14, with the adjacent sheets being ordinarily spaced from one another.

The supporting means C for the grinding machine B comprises preferably a three-point supporting frame including a hub 15 from which radiate the three substantially horizontal supporting legs 16, 17 and 18, said supporting legs being so positioned with respect to one another that they form, in effect, a spider tripod frame. The leg 16 projects to one side of the tables 10, while the legs 17 and 18 project to the opposite side, the leg 16 being supported upon and secured to the upper end of a vertical column 19, while the leg 17 is supported upon and secured to the upper end of a vertical column 20. The leg 18 is supported upon the column 20 of the adjacent supporting frame. The hub 15 of the supporting frame is offset with respect to legs 16, 17 and 18 and is formed with a central annular recess having a raised bearing portion 21 at substantially the center thereof.

The grinding machine B disclosed herein embodies a hollow housing 22 supported upon the hub 15 of frame C and being secured thereto by bolts or the like 23. Extending upwardly through the hub and housing 15 and 22 respectively is the main vertical drive spindle or shaft 24 to the lower end of which is secured the improved grinding tool or runner 25 provided by the present invention. The shaft 24 is journaled intermediate its ends within a bushing 26 mounted in the bearing portion 21 of the supporting frame. Slidably keyed to the shaft 24 and arranged within the recess in hub 15 is a worm gear 27 driven from the motor or prime mover 28 through the motor shaft 29 and a worm (not shown) which meshes with the worm gear 27. The grinding runner or tool 25 may be raised bodily by means of a lifting motor 30 having a suitable drive connection with the upper end of spindle 24.

The improved grinding runner or tool 25 is composed briefly of a central disk 31 and a plurality of individual rings 32, 33 and 34 respectively encircling said disk and being associated therewith and also with one another in a manner to form a grinding runner of substantially annular or disc formation. The disk 31 is of relatively small diameter and is preferably provided upon the bottom thereof with a central recess or depression 35. The said disk 31 as well as the several rings 32, 33 and 34 are also provided upon the under-surfaces thereof with the spaced grinding projections or lugs 36 of conventional form. The disk 31 is formed around the periphery thereof with a horizontal ledge 37 and the adjacent ring 32 is provided with a flange 38 positioned above and overhanging the ledge 37. In addition, the ring 32 is further provided around its periphery with a ledge 39 similar to ledge 37 on disk 31. The second ring 33 is likewise provided with a flange 40 similar to flange 38 on ring 32 and overhanging ledge 39, said ring 33 being formed in turn with a ledge 41 above which is disposed the flange 42 carried by outer ring 34.

When the grinding runner 25 is in normal operative position upon the glass, the flanges 38, 40 and 42 formed on rings 32, 33 and 34 respectively are spaced above the ledges 37, 39 and 41 provided upon disk 31 and rings 32 and 33 respectively as indicated by the full lines in Fig. 3 so that the said rings are permitted a limited amount of free vertical movement independently of one another and also relative to the disk 31. However, when it is desired to lift the grinding runner bodily off of the glass, the disk 31 is first raised, whereupon the ledge 37 thereof engaging flange 38 will effect a raising of the ring 32, and likewise ledges 39 and 41 engaging flanges 40 and 42 will effect the raising of rings 33 and 34 as indicated by the broken lines in Fig. 3.

The disk 31 may be secured to the lower end of spindle 24 by means of a suitable universal connection which will permit a limited amount of rocking movement of the runner and also bodily vertical movement thereof with respect to said spindle. In such a case, the disk 31 will of course be permitted to move vertically relative to and independently of the rings 32, 33 and 34.

Ordinarily, the desired grinding effect is obtained by the combined action of the grinding runner and an abrasive material which may be supplied upon the upper surfaces of the glass sheets in any preferred manner. By constructing the grinding tool as above described, each grinding ring is capable of free vertical movement relative to the adjacent rings. And likewise, the disk 31 may also be permitted a free vertical movement relative to the rings by the provision of a suitable connection between the said disk and spindle 24. Thus, should the glass sheets being carried beneath the grinding runner be of an ununiform thickness, the thicker portions or high spots engaging the runner will tend to lift only that ring with which the high spots come into contact. As a result, the glass will be subjected to the pressure exerted by the single raised ring only and will at no time be subjected to the entire weight of the runner. While the entire weight of the grinding runner upon a high spot on the sheet may be sufficient to break the same, a single ring is not adapted to exert sufficient pressure to cause such a breaking. If desired, in the operation of the continuous system for surfacing sheet glass, the first few grinding runners could be constructed as described above and, after the waves and high spots in the glass have been ground off under these runners, the balance of the runners could then be of single solid disks.

The individual rings 32, 33 and 34 are adapted to be driven as a unit with the disk 31 upon rotation of shaft 24 and in such a manner as not to interfere with the free vertical movement thereof. This is herein accomplished by the provision of the driving keys 43, 44 and 45 carried by disk 31 and rings 32 and 33 respectively, said keys being secured in place by fastening elements 46 and received within notches 47, 48 and 49 cut in the flanges 38, 40 and 42 of rings 32, 33 and 34. Thus, upon positive rotation of the central disk 31, the several rings will be driven in unison therewith while, at the same time, permitting the free vertical movement thereof. The keys 43, 44 and 45 perform, in effect, a dual function since, in addition to effecting the desired rotation of the rings, they also at the same time prevent rotation of said rings relative to the disk. Although the grinding runner has been illustrated and described as including three individual rings, it will be apparent that any other desired number may be used as preferred.

Referring now more particularly to Figs. 5 and 6, the type of grinding tool or runner disclosed therein is of substantially the same construction as that described hereinabove with the principal exception that, according to this arrangement, no driving keys or lugs are required for effecting the rotation of the individual rings as a unit. The grinding runner here disclosed is designated in its entirety by the numeral 25a and comprises a central member 50 of elliptical formation. Encircling the member 50 is an elliptical ring 51, while encircling the said ring 51 is a second ring 52. The opening within ring 52 is elliptical to correspond to the shape of ring 51, while the outer edge 53 of ring 52 is annular so as to provide a grinding runner of disc formation. It will, of course, be appreciated that a plurality of rings 51 can be used, and also that the outer edge of the ring 52 may be elliptical, if desired. The above-described arrangement will still necessitate the use of the ledges and flanges for raising the runner off of the glass but it does not require the use of any driving keys or lugs since the elliptical shape of the members will be sufficient to cause the several rings to be driven as a unit with the central member, while at the same time permitting the free vertical movement of the said rings relative to one another.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A glass surfacing runner, including a central surfacing member, a surfacing ring encircling said member and being freely movable vertically relative thereto, means for driving said member, and means for connecting the member and ring together so that they will be driven as a unit without interfering with the free vertical movement of the latter.

2. A glass surfacing runner, including a central rotatable surfacing member, a surfacing ring encircling said member and being freely movable bodily vertically relative thereto, and means carried by the member and engaging said ring for transmitting the rotary motion of said member to said ring without interfering with the free vertical movement of the latter.

3. A glass surfacing runner, including a central surfacing member, a surfacing ring encircling said member and being freely movable bodily vertically relative thereto, and means carried by said member and engaging said ring for preventing rotation of the latter relative to the former without interfering with the free vertical movement thereof.

4. A glass surfacing runner, including a central surfacing member, a surfacing ring encircling said member and being freely movable vertically relative thereto, means for driving said member, and means for connecting the member and ring together so that they will be driven as a unit without interfering with the free vertical movement of the latter, said connecting means also preventing rotation of the ring relative to the member.

5. A glass surfacing runner, including a central rotatable surfacing member, a surfacing ring encircling said member and being freely movable bodily vertically relative thereto, and means carried by said member and engaging said ring for preventing rotation of the latter relative to the former without interfering with the free vertical movement thereof, said means also serving to transmit the rotary motion of said central member to said ring so that the ring and member will be rotated as a unit.

6. A glass surfacing runner, including a central surfacing member, a surfacing ring encircling said member and being freely movable bodily vertically relative thereto, a portion of said member being adapted to engage the ring to lift the same upon raising of the said member.

7. A glass surfacing runner, including a central surfacing member, a surfacing ring encircling said member and being freely movable bodily vertically relative thereto, a portion of said ring overhanging and engaging said member so that the ring may be lifted bodily upon raising of the member.

8. A glass surfacing runner, including a central member, a ring encircling said member and being freely movable vertically relative thereto, said member having a ledge around its periphery and the said ring having a flange overhanging the ledge so that the ring may be lifted bodily upon raising of the member.

9. A glass surfacing runner, including a central surfacing member, a surfacing ring encircling said member and being freely movable vertically relative thereto, a portion of said member being adapted to engage the ring to lift the same upon raising of the said member, means for driving said member, and means for transmitting the rotary motion of said member to said ring so that the member and ring will be caused to rotate as a unit without interfering with the free vertical movement of the latter.

10. A glass surfacing runner, including a central rotatable surfacing member, a surfacing ring encircling said member and being freely movable bodily vertically relative thereto, a portion of said ring overhanging said member so that the ring may be lifted bodily upon raising of the member, and means carried by the member and engaging the ring for transmitting the rotary motion of said member to said ring without interfering with the free vertical movement of the latter.

11. A glass surfacing runner, including a central rotatable member, a ring encircling said member and being freely movable vertically relative thereto, said member having a ledge around its periphery and the said ring having a flange overhanging the ledge so that the ring may be lifted bodily upon raising of the member, and a key carried by said member and engaging said ring for transmitting the rotary motion of the member to the ring without interfering with the free vertical movement of the latter.

12. A glass surfacing runner, including a central surfacing member, and a plurality of individual surfacing rings encircling said member, said rings being freely movable bodily vertically relative to one another and also relative to said member.

13. A glass surfacing runner, including a central surfacing member, and a plurality of individual surfacing rings encircling said member, said rings and member being freely movable bodily vertically independently of and relative to one another.

14. A glass surfacing runner, including a central surfacing member of elliptical formation, an elliptical surfacing ring encircling said member and being freely movable vertically relative thereto.

15. A glass surfacing runner, including a central surfacing member of elliptical formation, and an annular surfacing ring encircling said member and being freely movable vertically relative thereto, the opening in said ring being also elliptical to correspond to the shape of said member and the outer edge of said ring being annular.

LE ROY L. HANDY.